(No Model.)
M. L. METZGER.
TEETHING RING.
No. 526,932. Patented Oct. 2, 1894.
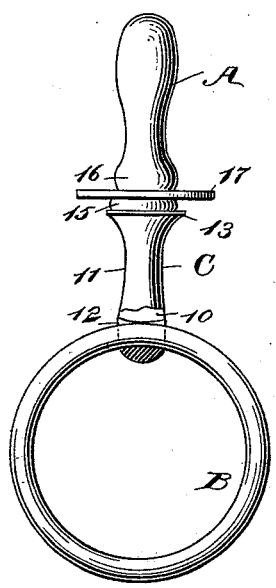
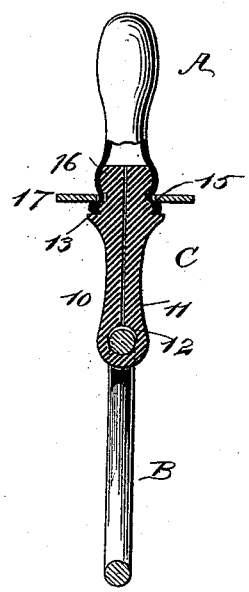
WITNESSES:
Paul Johot
C. Sedgwick
INVENTOR
M. L. Metzger
BY Munn & Co
ATTORNEYS.

UNITED STATES PATENT OFFICE.

MARTIN L. METZGER, OF NEW YORK, N. Y.

TEETHING-RING.

SPECIFICATION forming part of Letters Patent No. 526,932, dated October 2, 1894.

Application filed January 9, 1894. Serial No. 496,253. (No model.)

*To all whom it may concern:*

Be it known that I, MARTIN L. METZGER, of New York city, in the county and State of New York, have invented a new and useful Improvement in Blind Nipples, of which the following is a full, clear, and exact description.

My invention relates to an improvement in teething rings, and it has for its object to construct a teething ring in a manner whereby an unbroken ring may be connected with a rubber nipple in an exceedingly simple and economic manner.

The invention consists in the novel construction and combination of the several parts, as will be hereinafter fully set forth and pointed out in the claim.

Reference is to be had to the accompanying drawings, forming a part of this specification, in which similar figures and letters of reference indicate corresponding parts in all the views.

Figure 1 is a side elevation of the improved teething ring, a portion of the stem being broken away and in section; and Fig. 2 is a vertical section through the stem, the ring, a portion of the nipple and the flange which accompanies the nipple.

In carrying out the invention the nipple A may be of the usual construction and formation, and the ring B to be connected with the nipple may be made of any desired material, but the said ring is unbroken, being solid and continuous.

In connection with the nipple and ring a stem C, is employed to connect the two. This stem may be made of any desired material. Preferably, however, hard rubber is employed for the purpose, or any equivalent material having spring characteristics. The stem is divided preferably in the center from its upper end to a point near the lower end, whereby the major portion of the stem is in two connected sections, designated respectively as 10 and 11. A longitudinal cut or opening in the stem at the lower end of the latter meets an opening 12 which is made transversely in the stem, the said opening being adapted to receive the ring B. Thus the lower portion of the stem is virtually its hinge portion. The upper end of the stem is provided with an exterior shoulder 13, and preferably with two annular ribs 15 and 16, located above said shoulder. The ring is placed in position in the stem by springing its two sections 10 and 11 apart, and forcing the ring down into its socket or aperture 12. The nipple is forced over the ribs 15 and 16 practically to an engagement with the shoulder 13, and a washer or shield 17, is then forced over the nipple and over the upper rib of the stem, being made to bind the nipple to the stem between the lower and upper rib, the lower rib being of greater diameter than the upper one. If in practice it is found desirable a pin or rivet may be passed through the stem so as to positively connect its sections.

It is evident that when a teething ring is constructed in the manner above set forth it is very durable, especially so, as the ring is unbroken, being solid and continuous throughout its circumference. Furthermore, the ring may be attached to the stem in as expeditious and convenient a manner as under the old construction.

Having thus described my invention, I claim as new and desire to secure by Letters Patent—

A teething ring, the same consisting of a stem bent upon itself to form two opposing and contacting members, a transverse aperture being made at the lower portion of the stem and at the lower portion of the space between the members, annular ribs formed on the opposite end of the stem, a ring passed through the said aperture in the stem, and a nipple located on the end having the said ribs, substantially as shown and described.

MARTIN L. METZGER.

Witnesses:
JNO. M. RITTER,
F. W. HANAFORD.